April 13, 1937.   A. J. STEINBERGER ET AL   2,076,796
PROCESS FOR MOLDING THERMOPLASTIC MATERIALS AND PRODUCT THEREOF
Filed Aug. 25, 1931
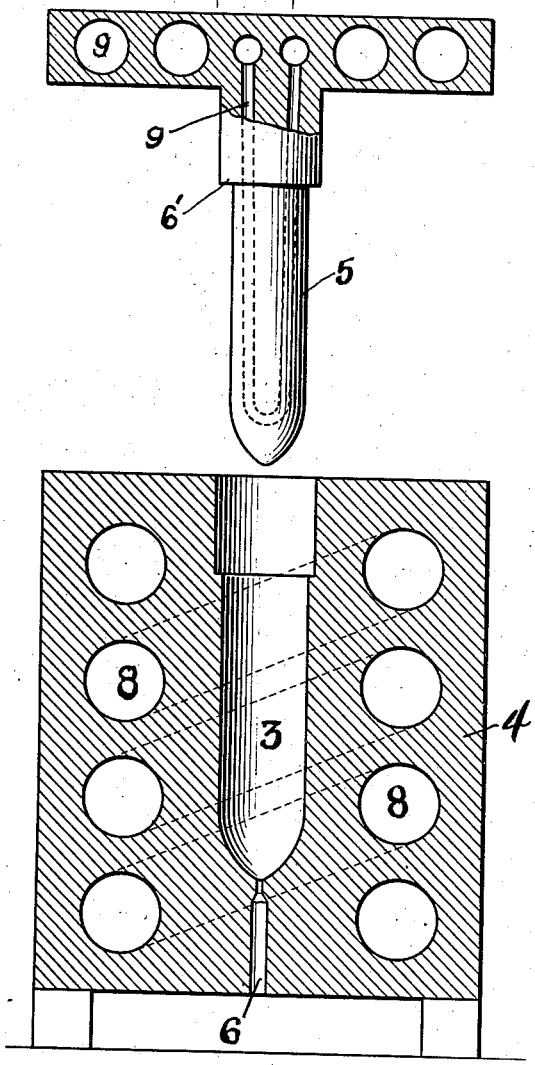
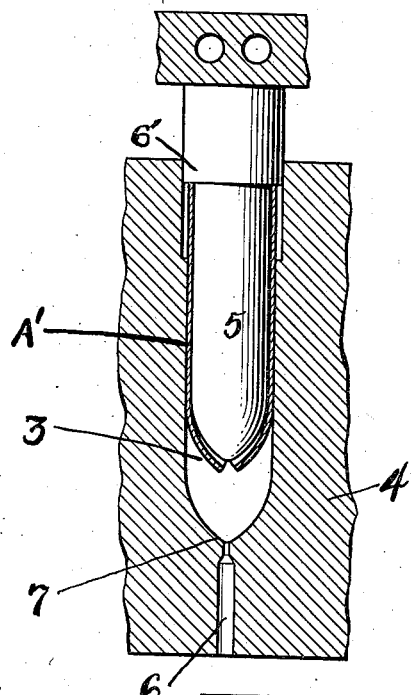
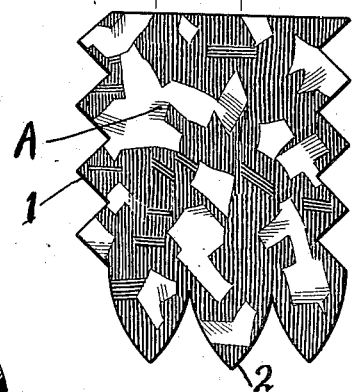
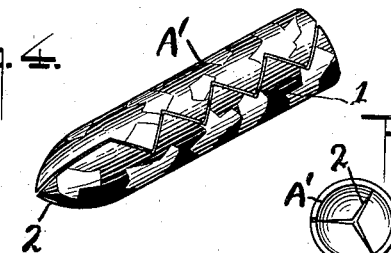
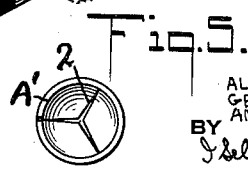
INVENTORS
ALFRED J. STEINBERGER
GERALD L. BASSETT
ANDREAS BIENENSTEIN
BY
ATTORNEYS Patented Apr. 13, 1937

2,076,796

UNITED STATES PATENT OFFICE 2,076,796

PROCESS FOR MOLDING THERMOPLASTIC MATERIALS AND PRODUCT THEREOF

Alfred J. Steinberger, Jamaica, N. Y., Gerald L. Bassett and Andreas Bienenstein, Toledo, Ohio, assignors of one-half to Celluloid Corporation, a corporation of New Jersey, and one-half to The Conklin Pen Company, a corporation of Ohio Application August 25, 1931, Serial No. 559,251

5 Claims. (Cl. 18—56)

This invention relates to the art of molding thermoplastic compositions and relates more particularly to the molding of plastic compositions containing derivatives of cellulose and having differential color effects.

An object of our invention is to provide means for molding articles made of thermoplastic compositions having differential color effects. Other objects of our invention will appear from the following detailed description.

In the molding of sheets of thermoplastic material to form articles, the usual method has been to heat both the male and female members of the mold to approximately the same temperature, preheat the sheet material until it becomes soft, insert the preheated sheet material between the members of the mold and press at suitable high pressure. In this previous method, there is considerable "flow" of the thermoplastic material. Therefore when multi-color effects, having designs of sharp outlines, are desired, this method is not practical, since because of the flow of the material, the sharp outlines or lines of demarcation between the colored designs and backgrounds of the original sheet are not maintained in the molded articles, so that blurred effects are obtained.

For this reason, prior to this invention, if differential color effects of sharp outlines were desired, it was necessary to resort to an expensive and wasteful process. Thus if fountain pens of multicolored designs of sharp outline were to be made, it was necessary to cut rods from blocks of differentially colored plastic compositions. This operation of cutting rods is very expensive and wasteful since about 40% of the material of the original block must be discarded as scrap. After seasoning of the rods to remove excess residual solvent, and the cutting of the same into proper lengths, the interiors must be drilled out and they then must be shaped on a lathe to form the fountain pen barrels or caps. These drilling and shaping operations also produce a high percentage of waste, so that the finished article contains less than 25% of that contained in the rods from which they are cut.

We have found that thermoplastic sheets and like material of differential color effects can be molded without distortion of the outlines or lines of demarcation between the colors, if a combination of vertical and horizontal pressures is employed during at least the final pressing. This may be done by causing the female member of the mold to cool more rapidly than the male member at the final stage of the pressing, and this cooling causes the female member of the mold to contract and thus exert a lateral pressure on the thermoplastic material to cause the closing of the seam where the edges of thermoplastic sheets join.

In accordance with our invention, we mold sheets, slabs and the like made of thermoplastic materials by pressing the same between members of a mold at suitable temperatures, and at least in the final stage causing the outer or female member of the mold to cool more rapidly than the inner or male member, whereby said outer member contracts and exerts a lateral pressure on the thermoplastic material.

While this invention is applicable to the molding of thermoplastic material of any kind, it is particularly applicable to the molding of plastic compositions containing cellulose nitrate or organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. The derivative of cellulose may be plasticized with a suitable amount of plasticizer, such as camphor, dimethyl phthalate, diethyl phthalate, diethyl tartrate, dibutyl tartrate, para ethyl toluene sulfonamid, triacetin, monomethyl xylene sulfonamid, etc. depending upon the particular derivative of cellulose present. The amount of plasticizer employed will vary from 15 to 100% or more of the weight of the derivative of cellulose, as is well understood in the art.

This invention is of particular importance in connection with the molding of sheets or slabs having differential color effects of various designs, such as mottled effects and the like, and particularly where multicolored designs of sharp outline are desired. The various colors may be imparted by the use of pigments and/or dyes ordinarily employed for the purpose. If desired part of the material may present a pearl or nacreous effect.

As stated, the essential feature of this invention is the causing of the female or outer member of the mold to cool more rapidly than the "force" or male member at the final stages of the pressing, whereby the relative contraction of the female member exerts a lateral pressure on the material being molded, while vertical pressure is being applied by the male or force member by hydraulic or other suitable pressure.

Any articles of suitable shape may be made by this invention, examples of which are fountain pen barrels and caps, pencils, trays, toilet articles, jars, cosmetic containers, etc.

In order to aid the visualization of one mode of carrying out this invention but without being limited thereto, reference is had to the accompanying drawing, wherein Fig. 1 is an elevation partly in section showing the male and female members of a mold that may be used for one mode of carrying out our invention, Fig. 2 is a cross-section of the mold members showing a rolled up blank in position to be pushed down by the shoulder of the male member, Fig. 3 is a view of the cut-out blank prior to being rolled up, Fig. 4 shows the blank after it is rolled up, and Fig. 5 is a view of the end of such rolled up blank.

As an example for making an article of mottled effect of black and white the following is given. A plastic composition containing a derivative of cellulose, preferably cellulose acetate, of each color is worked up into sheets on a pair of heated malaxating rolls in the ordinary manner. The sheets are then cut into dice or pieces of other shape of a suitable size, and the black and white dice are mixed in the desired proportion. This mixture of colored dice is then pressed in a press at elevated temperatures and pressures to form a solid block. The pressed block is then placed on a planer and sheets of desired thickness are cut therefrom. These sheets are seasoned to remove excess residual solvent and are ready for molding.

Strips or sheets of suitable size depending upon the articles to be molded are then cut to predetermined size and shape. Thus if fountain pen barrels or caps are to be made, a blank A (Fig. 3) is cut from the sheet, such blank having serrated edges 1, 2 which fit into each other when the blank is rolled into a cylinder. The blank is softened, say by warming, so that it may be rolled into the form of a cylinder A' (Figs. 2, 4 and 5) to fit as closely as possible the inside 3 of the female member 4 or mold cavity, the blank being of such size as to supply a very slight excess of material, that is, it is of such size that its volume is slightly in excess of that of the space between the male member 5 and female member 4 when the mold is closed. The roll of material A' is placed in the female member or mold cavity 4, which is provided with a vent 6 at the lower end thereof to permit a slight excess amount of material to flow out or extrude at the proper time.

At this stage the female member of the mold is at low temperatures, which may be below room temperatures, room temperatures or temperatures up to say 100 to 150° F. Thereupon the male or force member 5, which is hot, having a temperature of say 200 to 350° F., and which is provided with a shoulder 6', is forced into the centre of the rolled up material A'. The shoulder 6' on this male member forces the rolled up material A' down into the cavity 3 of the mold 4 until the lower end of the material reaches the bottom 7 of the mold.

This forcing down of the material into the mold and the closing of the mold is done under low pressure and while the female member of the mold is comparatively cool. After the rolled up material has bottomed in the female member or mold cavity, heat is applied to such female member by causing steam of suitable temperature and pressure to flow through the channels 8 in the female member 4 to cause the same to attain a temperature of 200 to 350° F.

During the heating of the female member and after the material has attained a predetermined position, pressure is gradually applied by hydraulic or any other suitable means to the male or "force" member until a high pressure say 800 to 4000 pounds per square inch is attained to close the mold completely. When a small amount of the thermoplastic material extrudes from the vent 6 in the lower part of the female member or mold cavity 4, cooling water or other fluid is caused to flow first into the channels 8 of the female and then into the channels 9 of the male member. In certain constructions of mold members the cooling liquid may be caused to flow into both male and female members simultaneously, since the female member cools more rapidly than the male member. In either event, the female member of the mold cools sooner than the male member, and therefore contracts and quickly exerts a contracting action on the thermoplastic material.

The resulting combination of vertical pressure and horizontal pressure due to the quick contraction of the female member closes the joints or seams of the thermoplastic material.

This combination of vertical and horizontal pressures in connection with the slight extrusion, predetermined size and shape of the sheet or slab material, and method of heating and chilling, causes the material not only to unite at the joints or seams, but causes such a minimum flow that the original designs or figures of the sheets or slabs are retained in the finished molded part, that there occurs no distortion or such slight distortion as is not noticeable.

It will be seen that in our method of molding the joints of the blank are integrated or matched while flow of the material is restricted so as to maintain the integrity of the design of the sheet-like material without substantial distortion. This is brought about by the various steps of the process.

By our employing a blank which has a volume only slightly in excess of that of the space between the male and female members when the mold is closed, flow of the material is restricted. Moreover when the material is being pressed into the mold by the hot male member while the female member is comparatively cool, flow of the material on the outside surface thereof, that is, the surface that is in contact with the female member is prevented. When both the male and female members are heated and high pressure is applied to the thermoplastic material, the joints start to become integrated by the upsetting operation at the joints, but there is not sufficient flow to impair the integrity of the design. Upon the final contraction of the female member due to its cooling more rapidly than the male member, the pressure exerted causes the completion of the integration of the joints.

By this process, a molded piece is formed in which the integrity of the mottled configuration of the material is preserved and not distorted and not "flowed" out. In this way, articles can be made of materials possessing beautiful and artistic configurations which have heretofore been impossible to make except by the very expensive method of shaping on the lathe, drilling, etc.

It is to be understood that the foregoing detailed description is given merely by way of illustration and that many variations may be made therein without departing from the spirit of our invention.

Having described our invention, what we desire to secure by Letters Patent is:

1. Molded articles of thermoplastic material having a closed end formed from a single blank having complementary and abutting edges, said edges being interlocked and joined together by the flowing of the material of the blank along said edges.

2. Molded articles of thermoplastic material containing cellulose acetate having a closed end formed from a single blank having complementary and abutting edges, said edges being interlocked and joined together by the flowing of the material of the blank along said edges.

3. Articles having colored designs of sharp outline and having a closed end formed from a single patterned blank of thermoplastic material containing a derivative of cellulose having complementary and abutting edges, said edges being interlocked and joined together by the flowing of the material of the blank along said edges.

4. Articles having colored designs of sharp outline and having a closed end formed from a single patterned blank of thermoplastic material containing cellulose acetate having complementary and abutting edges, said edges being interlocked and joined together by the flowing of the material of the blank along said edges.

5. Method for the production of tubular bodies, having a closed end, from a thermoplastic composition in sheet form having designs of sharp outline, which comprises introducing the thermoplastic composition in the form of suitably cut blanks in between the male and female members of a heated mold, integrating the adjacent edges of the blank by bringing the blank to a state of fluidity insufficient to distort the outline of the design and applying longitudinal and lateral pressures to said blank, the lateral pressure being effected by cooling the female member of the mold while the male member remains hot.

ALFRED J. STEINBERGER.
GERALD L. BASSETT.
ANDREAS BIENENSTEIN.